US012393164B2

(12) United States Patent
Zaugg

(10) Patent No.: US 12,393,164 B2
(45) Date of Patent: Aug. 19, 2025

(54) NATURAL ESCAPEMENT FOR HOROLOGICAL MOVEMENT AND HOROLOGICAL MOVEMENT COMPRISING SUCH AN ESCAPEMENT

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 429 days.

(21) Appl. No.: 17/988,897

(22) Filed: Nov. 17, 2022

(65) Prior Publication Data

US 2023/0185240 A1 Jun. 15, 2023

(30) Foreign Application Priority Data

Dec. 9, 2021 (EP) .................................... 21213346

(51) Int. Cl.
*G04B 15/08* (2006.01)
*G04B 15/14* (2006.01)

(52) U.S. Cl.
CPC ............. *G04B 15/08* (2013.01); *G04B 15/14* (2013.01)

(58) Field of Classification Search
None
See application file for complete search history.

(56) References Cited

U.S. PATENT DOCUMENTS 7,607,822 B2 * 10/2009 Cabezas Jurin ....... G04B 15/06 368/127

FOREIGN PATENT DOCUMENTS

| | | | | |
|---|---|---|---|---|
| EP | 2 487 546 A1 | | 8/2012 | |
| JP | 6206877 B2 | * | 10/2017 | ............ G04B 1/225 |
| WO | 2020/043720 A1 | | 3/2020 | |

OTHER PUBLICATIONS

European Search Report for EP 21 21 3346, dated May 6, 2022.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

A natural escapement for horological movement carrying out a succession of operating cycles each including a first and second alternation of a balance that comprises a balance wheel on an arbor of which is adjusted a balance plate. A first escape wheel set having a first toothing is driven by a wheel set of the train of the horological movement, driving in turn a second escape wheel set having a second toothing. The first and second wheel sets form a kinematic chain arranged to cooperate with an anchor to pivot about an anchor-staff, the balance plate carrying a second impulse pallet-stone through which the balance plate receives a direct and tangential driving impulse from the first escape wheel set during the first alternation, and a first impulse pallet-stone through which this balance plate receives a direct and tangential driving impulse from the second escape wheel set during the second alternation.

7 Claims, 8 Drawing Sheets

NATURAL ESCAPEMENT FOR HOROLOGICAL MOVEMENT AND HOROLOGICAL MOVEMENT COMPRISING SUCH AN ESCAPEMENT

CROSS REFERENCE TO RELATED APPLICATIONS

This application claims priority to European Patent Application No. 21213346.6 filed Dec. 9, 2021, the entire contents of which are incorporated herein by reference.

TECHNICAL FIELD OF THE INVENTION

The present invention relates to a natural escapement for horological movement also known under its name tangential impulse escapement. The present invention more particularly relates to a natural escapement protected against the damages that may be caused by a premature release of the escapement impulse.

TECHNOLOGICAL BACKGROUND

The principle of the natural escapement was invented by Abraham Louis Breguet at the beginning of the 19th Century. The advantage of Breguet's natural escapement is particularly that it is a free escapement insofar as the balance is only disturbed by the operation of the escapement over a small fraction of its oscillation. The advantage of Breguet's natural escapement is also that it gives with each alternation a direct and tangential impulse to the balance. In other words, energy is transferred directly from the escape wheel to the balance, without passing through an anchor. Moreover, the transmission of energy only takes place tangentially, so that the frictions generated by the operation of this escapement are limited. Unlike a detent escapement, a natural escapement does not have a coup perdu in its function for maintaining oscillations of the balance; it delivers a similar impulse with each alternation, in a symmetrical and more uniform manner, so that the losses of mechanical energy by coup perdu are eliminated. All of these qualities thus make the natural escapement potentially one of the most efficient.

Breguet nevertheless subsequently discovered that the natural escapement that he had invented had certain drawbacks foremost of which mention may be made of the fact that the last escape wheel is not under the tension of the geartrain when the first wheel gives the impulse or when the latter is locked. The various plays in geartrains and the manufacturing quality of the various components incorporated into the composition of a Breguet natural escapement may thus cause an incorrect positioning of the last escape wheel and, consequently, a malfunction of the escapement accompanied with parasitic noises. Furthermore, as the escape wheel is free, its position is unstable, so that the operational safety of such a natural escapement is poor.

Of course, many improvements have been made to the original Breguet natural escapement to attempt to overcome the above-mentioned drawbacks. Nevertheless, despite the efforts of successive watch manufacturers, difficulties remain. Some watchmakers have thus proposed to superimpose the two escape wheels, a solution which, of course, increases the thickness of the movement and makes it difficult to integrate such a movement into a watch case. Other watch manufacturers have for their part proposed to position the anchor between the two escape wheels, in the plane of the latter. Here too, such a solution is bulky, this time in the plane of the movement. In addition, whether the escape wheels are superimposed or the anchor is disposed between the two escape wheels, it has been realised upon use that the watchmakers had difficulties in accessing the various components of the escapement, in particular when this concerned adjusting the depth of penetration of the teeth of the second escape wheel with the entry and exit pallets of the anchor. In addition, when a natural escapement operates at low amplitude, at the end of autonomy of the barrel spring for example, or when the watchmaker carries out control manipulations and when for this they retain the balance wheel, it may transpire that a release of the impulse occurs while neither of the two impulse pallet-stones carried by the balance plate is engaged in the perimeter of rotation of the teeth of one or other of the escape wheels. Generally, such a malfunction occurs when neither of the two impulse pallet-stones has arrived in the perimeter of rotation of the teeth of one or other of the escape wheels and that the impulse tooth of the escape wheel passes in front of the impulse pallet-stone without giving impulses to the latter. This situation is observed when the balance rotates too slowly with a low amplitude, or when the watchmaker manipulates the balance. In such cases, the escape wheels are not retained by the escapement function and may rotate uncontrollably. This then causes at best a loss of the timekeeper function with an undesired advance, and at worst a sudden stop after acceleration of the train in one or other of its locking positions that may lead to a deterioration of the components of the train and of the escapement.

SUMMARY OF THE INVENTION

The aim of the present invention is to remedy the above-mentioned problems as well as others also by providing a natural escapement for a horological movement that is protected against premature releases.

To this end, the invention relates to a natural escapement for horological movement performing a succession of operating cycles each consisting of a first and of a second alternation of a balance that comprises a balance wheel on an arbor of which is adjusted a balance plate, this natural escapement comprising a first escape wheel set having at least one first toothing, this first escape wheel set, arranged to be driven by a wheel set of the train of the horological movement, driving in turn a second escape wheel set having at least one second toothing, the first and second escape wheel sets forming a kinematic chain arranged to cooperate with an anchor capable of pivoting about an anchor-staff, the balance plate carrying a second impulse pallet-stone through which this balance plate receives a direct and tangential driving impulse from the first escape wheel set during the first alternation, and a first impulse pallet-stone through which this balance plate receives a direct and tangential driving impulse from the second escape wheel set during the second alternation, the balance plate also carrying at least one first safety tooth arranged to cooperate with the toothing of one of the first and second escape wheel sets so as to lock this first or this second escape wheel set when it escapes to the second impulse pallet-stone, respectively to the first impulse pallet-stone.

According to special embodiments of the invention:

- the balance plate carries a first safety tooth arranged to cooperate with the toothing of the first escape wheel set, and a second safety tooth arranged to cooperate with the toothing of the second escape wheel set;
- the first and second safety teeth are made in one piece with the balance plate;

the first and second safety teeth are attached on the balance plate.

The invention also relates to a horological movement comprising an escapement of the type described above.

Thanks to these features, the present invention provides a natural escapement protected against the damages that may be created by a premature release of the impulse. Indeed, by teaching to provide the balance plate with at least one safety tooth arranged such that this safety tooth is engaged in the perimeter of rotation of the teeth of the escape wheel set before the corresponding impulse pallet-stone becomes engaged in this same perimeter of rotation of the escape wheel sets, the present invention makes it possible to retain the escape wheel sets when they are not retained by the escapement function and to prevent these escape wheel sets from rotating uncontrollably.

BRIEF DESCRIPTION OF THE FIGURES

Other features and advantages of the present invention will become more apparent from the following detailed description of one embodiment of a natural escapement according to the invention, this example being given for purely illustrative and non-limiting purposes only in connection with the appended drawing wherein.

DETAILED DESCRIPTION OF THE INVENTION

The present invention proceeds from the general inventive idea that consists in providing the balance plate of a natural escapement for horological movement with at least one safety tooth that is arranged such that this safety tooth is engaged with the toothing of one of the escape wheel sets when the corresponding impulse pallet-stone carried by the balance plate is not yet engaged in the perimeter of rotation of the toothing of this escape wheel set. The present invention thus makes it possible to retain the escape wheel sets when they are not retained by the escapement function and prevent these escape wheel sets from rotating uncontrollably, which may cause a loss of the timekeeping function with an undesired advance, or even, in the most unfavourable cases, a sudden stop after acceleration in the locking position that may result in a deterioration of certain components of the mechanism.

Figure 1:
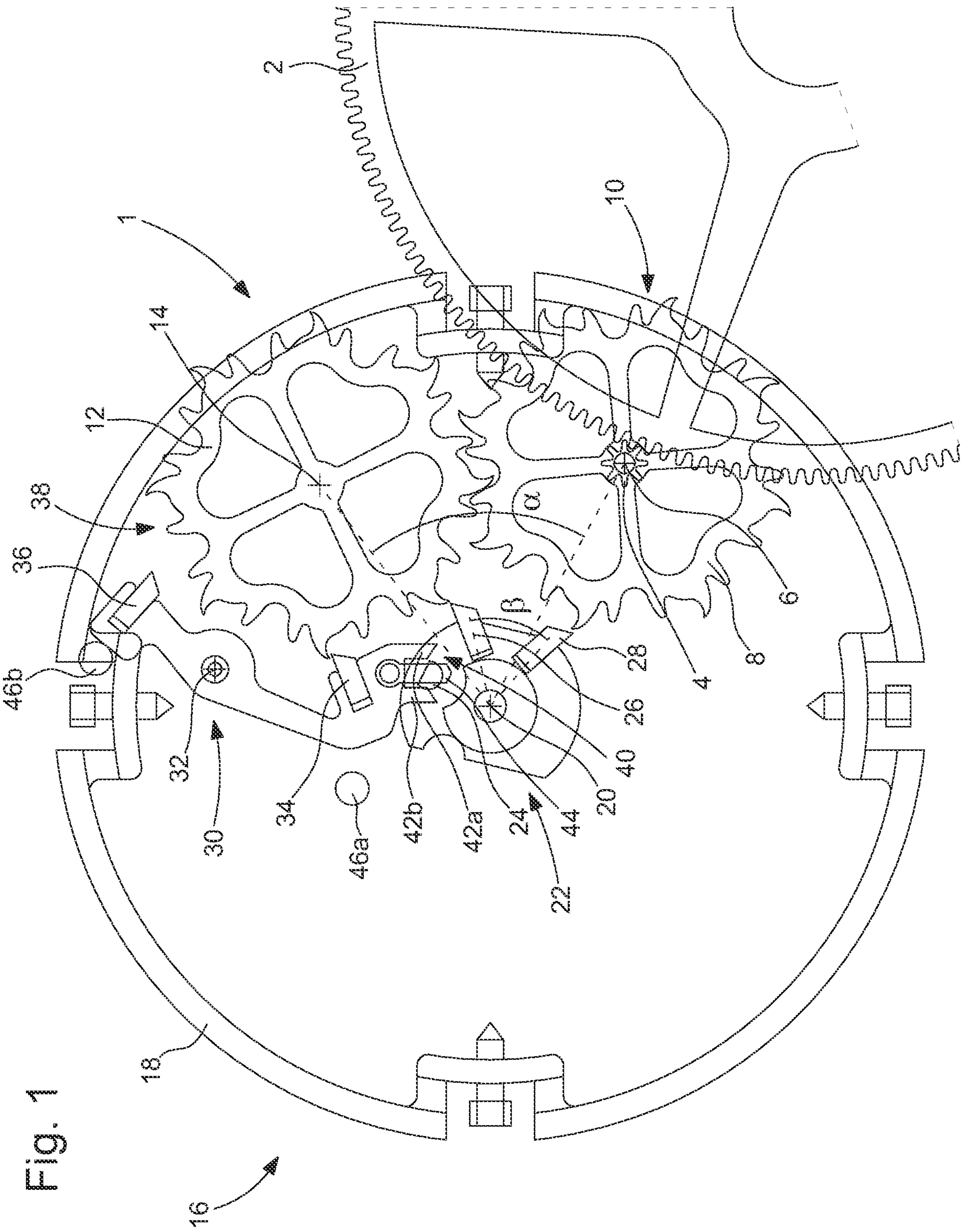
FIG. 1 is an overview of a natural escapement.

Designated as a whole by the general numerical reference 1, the natural escapement is arranged to be driven by a wheel set of the train of the horological movement, for example the second wheel set 2, which meshes with a pinion 4 fixedly mounted on an arbor 6 of a first escape wheel set that, in the example shown in FIG. 1, consists of a first escape wheel 8. This first escape wheel 8 meshes in turn via a toothing 10 with a second escape wheel set which, in the example shown in the drawing, consists of a second escape wheel 12 that pivots about an arbor 14.

The natural escapement 1 also comprises a balance 16 that comprises a balance wheel 18 on an arbor 20 of which is adjusted a balance plate 22. This balance plate 22 carries a balance pin 24 as well as a first and a second impulse pallet-stone 26 and 28 the respective roles of which will be described below.

Finally, the natural escapement 1 comprises an anchor 30 pivoted about an anchor-staff 32 and that carries an exit pallet 34 and an entry pallet 36. Thanks to these exit 34 and entry pallets 36 that penetrate into a toothing 38 of the second escape wheel 12, the anchor 30 is able to alternately lock and release this second escape wheel 12. The anchor 30 also comprises a fork 40 formed of a first and of a second horn 42*a* and 42*b* and that carries a dart 44. This dart 44 cooperates with the balance plate 22 and has the function of preventing the accidental movements of the fork 40 outside of periods called angle of lift during which the balance plate 22 is close to its locking position. The anchor 30 is disposed after the second escape wheel 12, at the exit of the kinematic chain formed by the first and second escape wheels 8 and 12. More specifically, according to the non-limiting embodiment shown in the drawing, the pivot point of the anchor 30, materialised by the anchor-staff 32, is outside of the angle $\alpha$ less than 180° and delimited by two straight lines that pass through the arbor 20 of the balance wheel 18 and through the arbor 6 of the first escape wheel 8 for one, and through the arbor 20 of the balance wheel 18 and through the arbor 14 of the second escape wheel 12 for the other. The natural escapement 1 is therefore less bulky than the natural escapements of the prior art wherein the pallet is usually placed between and above the first and second escape wheels. The natural escapement 1 is therefore easier to house in the horological movement of which it regulates the operation. Likewise, the arrangement of the anchor 30 at the end of the kinematic chain formed by the first and second escape wheels 8 and 12 makes the interventions of the watchmaker less difficult, in particular as regards the measurement and the adjustment of the depth of penetration of the exit 34 and entry pallets 36 in the toothing 38 of the second escape wheel 12. The natural escapement 1 is completed by a first and a second banking-pin 46*a* and 46*b* that limit the pivoting displacement of the anchor 30.

In the embodiment of the natural escapement 1 illustrated in the drawing, it is assumed that the second wheel set 2 that supplies the natural escapement 1 with the energy necessary for its operation rotates in the anti-clockwise direction. Consequently, the second wheel set 2 tends to rotate the pinion 4 and the first escape wheel 8 of the arbor 6 of which is fixed the pinion 4 in the clockwise direction, and the second escape wheel set 12 in the anti-clockwise direction.

Figure 2A:
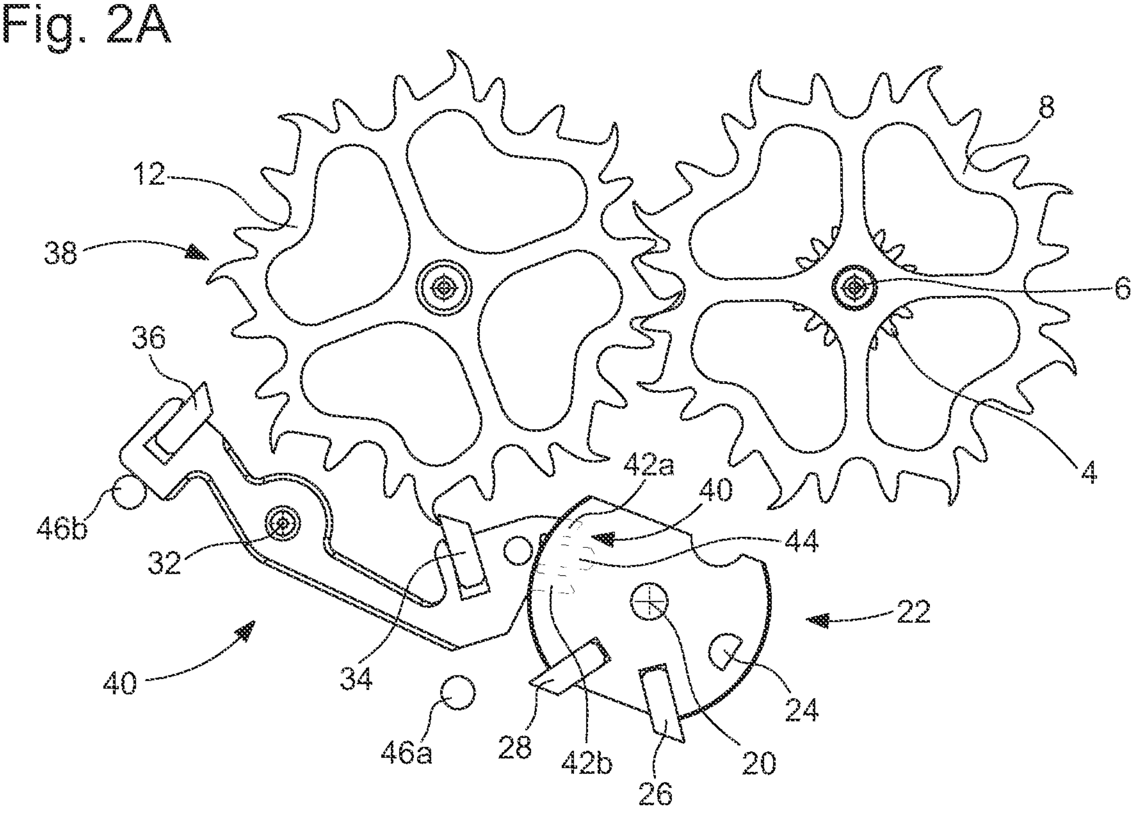
FIG. 2A is a view of the natural escapement of FIG. 1 in its first extreme position at the beginning of a cycle.

An operating cycle of the natural escapement 1 comprises two alternations during which the balance plate 22 will go successively from a first extreme position to a second extreme position by passing through a middle locking position, then from its second extreme position to its first extreme position by passing again through its middle locking position. Thus, at the beginning of a cycle (see FIG. 2A), the second escape wheel 12 is pressed on the exit pallet 34 and the natural escapement 1 is locked by pressing the anchor 30 against the second banking-pin 46*b*. Indeed, the angle of draw formed by pressing the tip of the tooth of the second escape wheel 12 on the exit pallet 34 opposes a resistance to the unlocking of the anchor 30 by tending to pivot this anchor 30 in the anti-clockwise direction against the second banking-pin 46*b*. This function of drawing the anchor 30 on the second banking-pin 46*b* by the second escape wheel 12 during the free portion of the alternation of the balance plate 22 is similar to that of Swiss lever escapements. The balance plate 22 then leaves this first extreme position by rotating in the anti-clockwise direction.

Figure 2B:
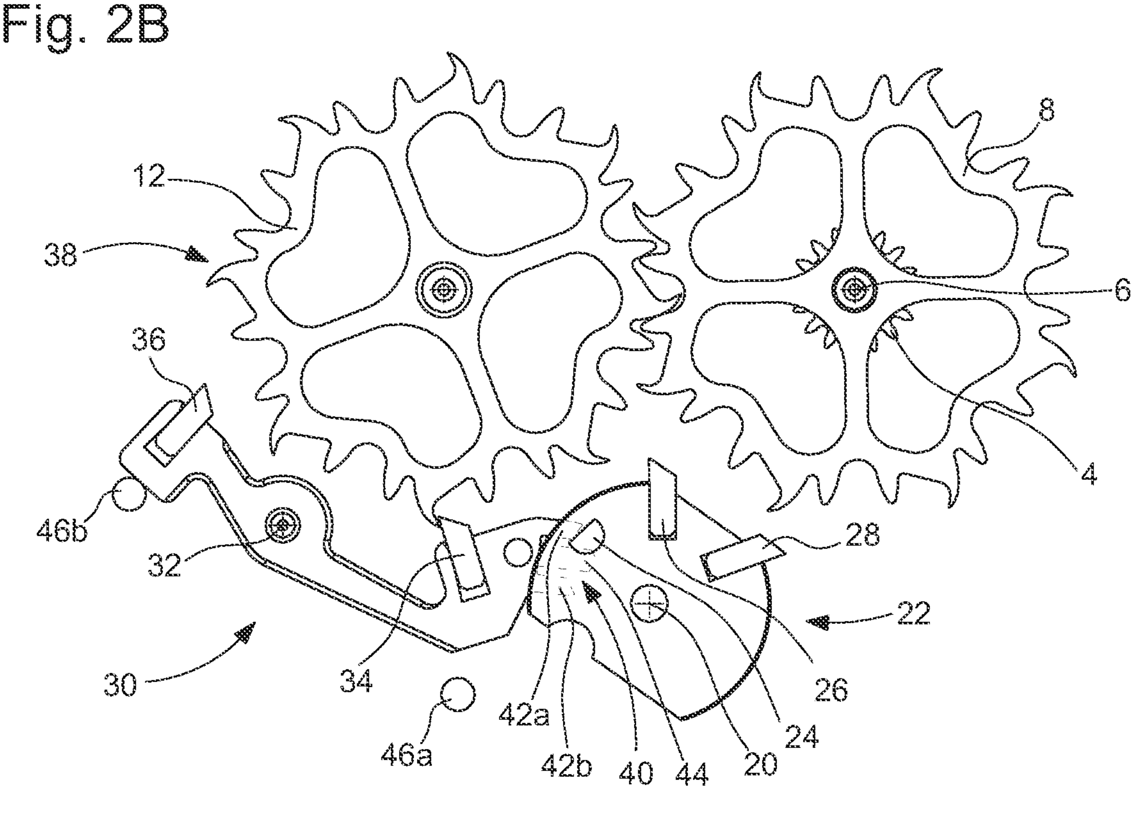
FIG. 2B is a view of the natural escapement in its locking position during the first alternation at the moment when the balance plate is about to pivot the anchor.

At a given moment of its movement during the first alternation (see FIG. 2B), the balance plate 22 arrives in its middle locking position. Just before arriving in this position, the balance plate 22 comes to abut by its balance pin 24 against the second horn 42*b* of the fork 40 and causes the anchor 30 to pivot in the clockwise direction.

Figure 2C:
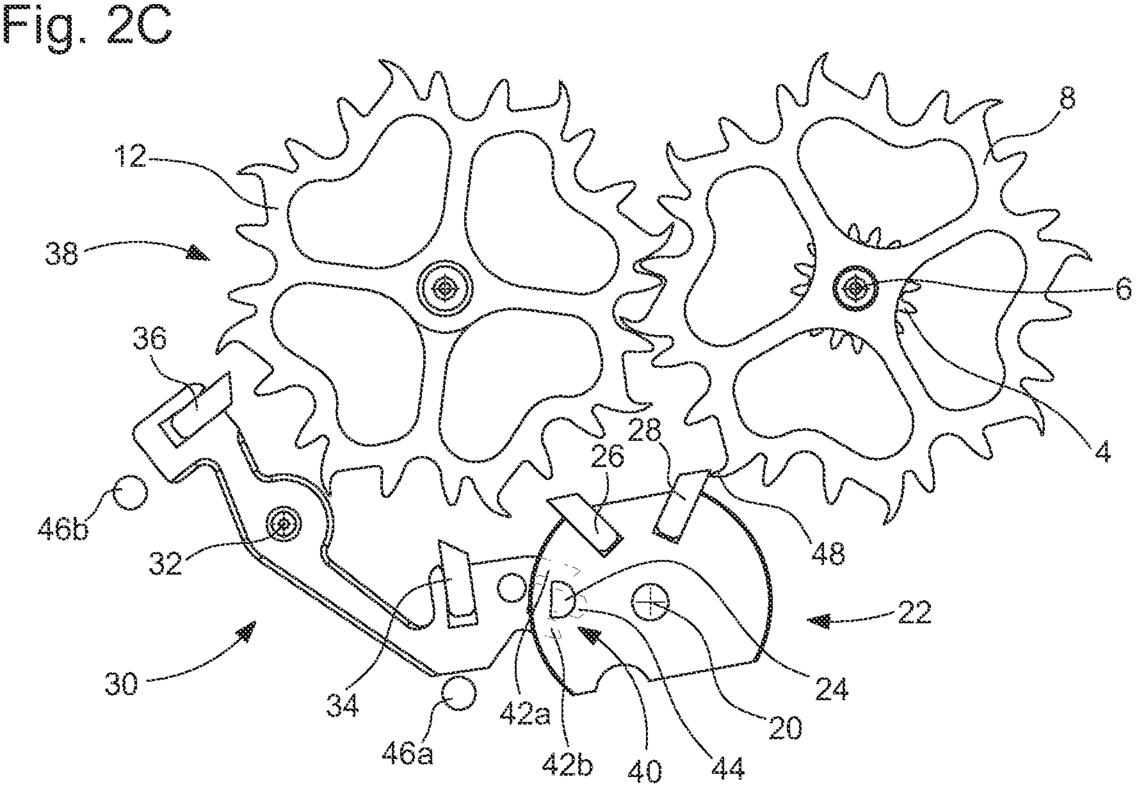
FIG. 2C is a view of the natural escapement at the moment when the second escape wheel set is released from its engagement with the exit pallet, which makes it possible for the second wheel to drive, via the first escape wheel set, this second escape wheel set, the first escape wheel set further giving, via its impulse tooth, a so-called direct and tangential driving impulse to the impulse pallet-stone of the balance plate.

The clockwise pivoting of the anchor 30 has the effect of releasing the second escape wheel 12 from its engagement with the exit pallet 34, which makes it possible for the second wheel set 2 to drive, via the first escape wheel 8, the second escape wheel 12 in the anti-clockwise direction (see FIG. 2C).

Figure 2D:
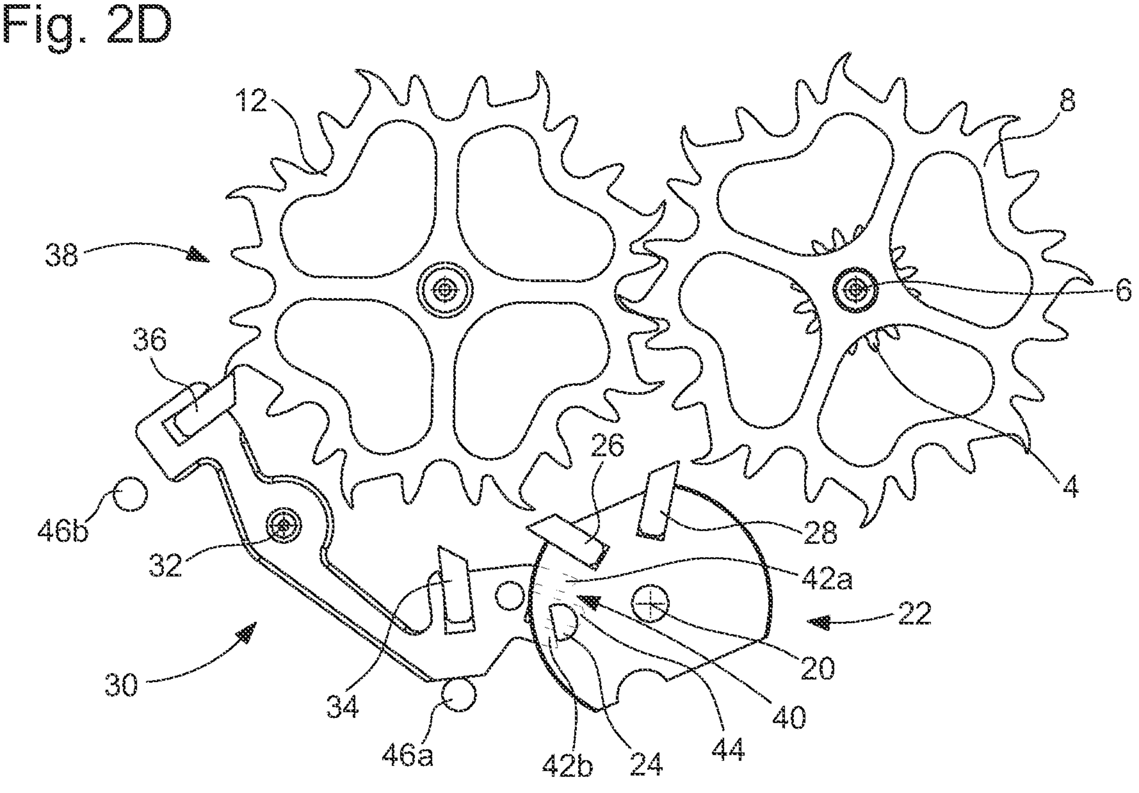
FIG. 2D is a view of the natural escapement at the moment when the pivoting of the second escape wheel set is again interrupted when, under the effect of the pivoting of the anchor, this second escape wheel set is pressed the entry pallet.

The pivoting of the second escape wheel 12 is again interrupted when, under the effect of the pivoting of the anchor 30, this second escape wheel 12 is pressed on the entry pallet 36, this position being maintained thanks to pressing the anchor 30 against the first banking-pin 46*a* (see FIG. 2D). Indeed, the angle of draw formed by pressing the tip of the tooth of the second escape wheel 12 on the entry pallet 36 opposes a resistance to the unlocking of the anchor 30 by tending to pivot this anchor 30 in the clockwise direction against the first banking-pin 46*a*. This function of drawing the anchor 30 on the first banking-pin 46*a* by the second escape wheel 12 during the free portion of the alternation of the balance plate 22 is similar to that of Swiss lever escapements.

It will be noted that at the same time as the first escape wheel 8 drives the second escape wheel 12 by pivoting in the anti-clockwise direction, the first escape wheel 8 also gives a driving impulse to the balance plate 22 via one of its teeth 48 referred to as impulse tooth that drives the second impulse pallet-stone 28 (see FIG. 2C). This driving impulse is called direct and tangential impulse because it is given directly by the first escape wheel 8 to the balance plate 22 and the path of the impulse tooth 48 tangentially catches that of the second impulse pallet-stone 28 of the balance plate 22, which makes an almost punctual contact possible and without friction.

Figure 2E:
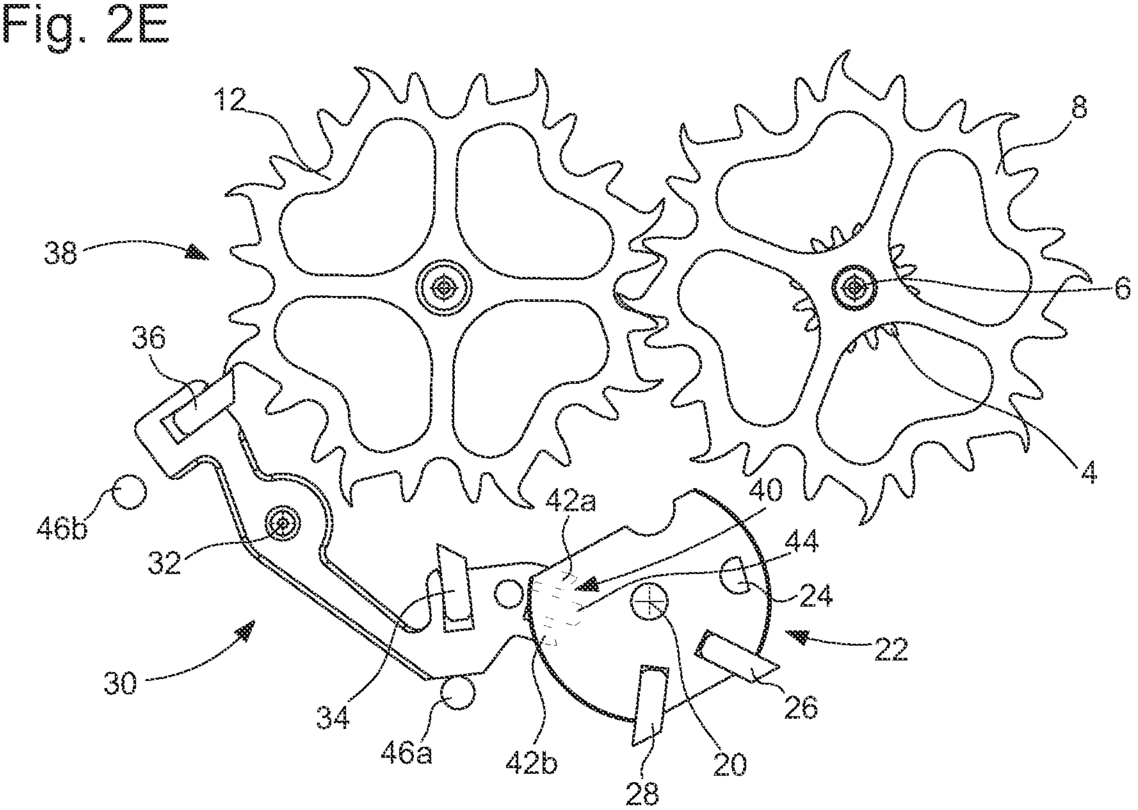
FIG. 2E is a view of the natural escapement at the moment when the balance plate is in its second extreme position wherein it is completely removed from its locking position, which marks the end of the first alternation of operation of the natural escapement.

The balance plate 22 thus moves up to its second extreme position wherein it is completely removed from its locking position, which marks the end of the first alternation of operation of the natural escapement 1 (see FIG. 2E).

Figure 2F:
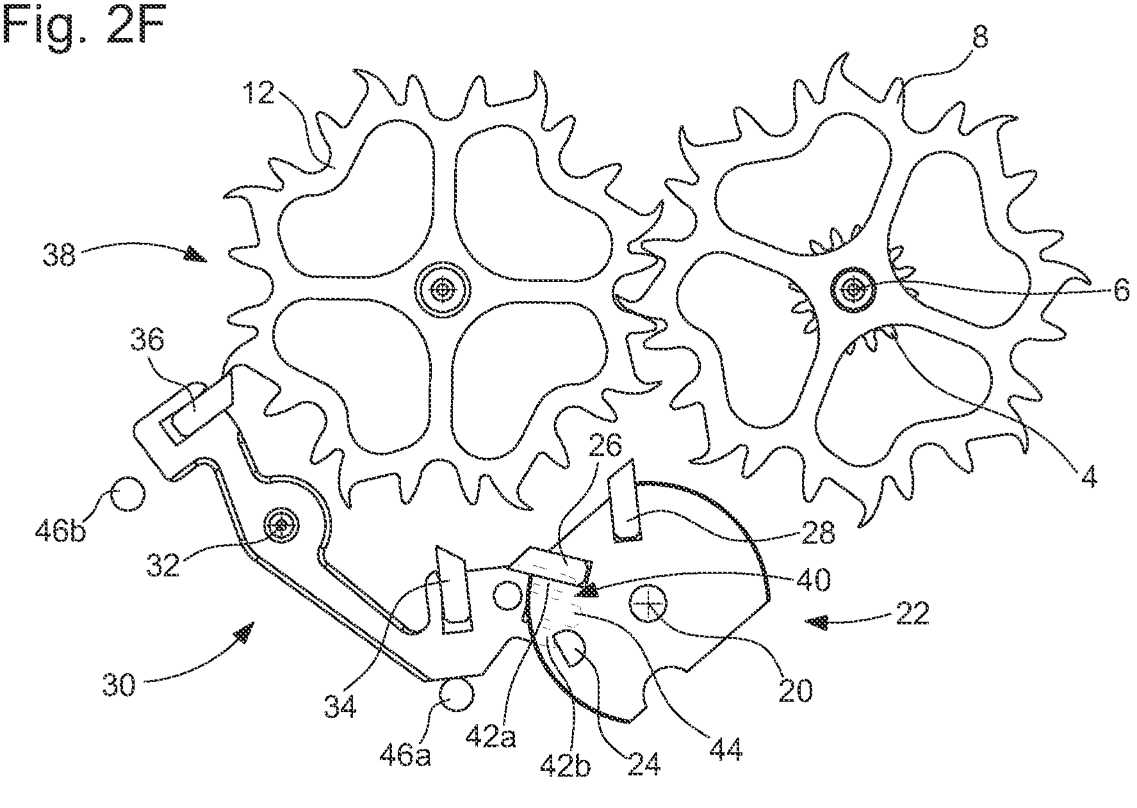
FIG. 2F is a view of the natural escapement at the moment when, during the second alternation, the balance plate has returned in its locking position and is about to pivot the anchor again.

At the beginning of the second alternation of operation of the natural escapement 1, the balance plate 22, returned by the spiral spring of the balance (not visible in the drawing), starts to rotate in the clockwise direction until it comes to abut by its balance pin 24 against the first horn 42*a* of the fork 40 and causes the anchor 30 to pivot in the clockwise direction (see FIG. 2F).

Figure 2G:
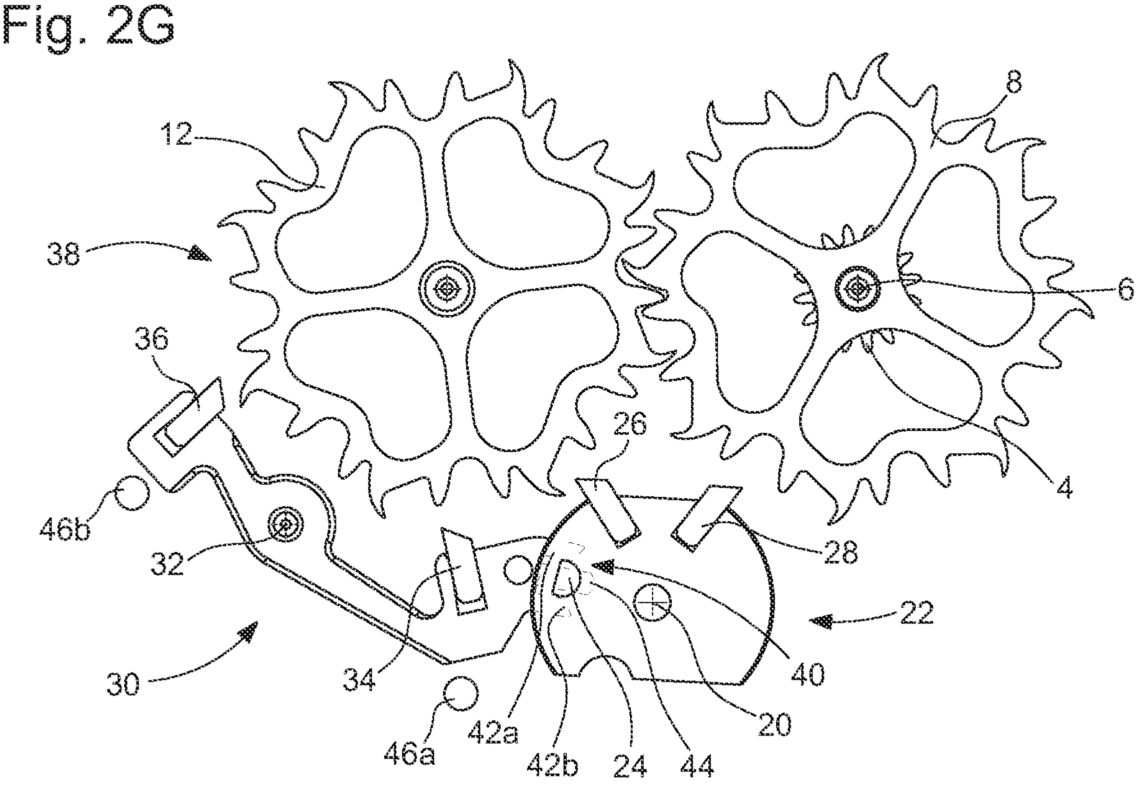
FIG. 2G is a view of the natural escapement at the moment when the second escape wheel set is released from its engagement with the entry pallet, which makes it possible for the second wheel set to drive, via the first escape wheel set, this second escape wheel set.

The anti-clockwise pivoting of the anchor 30 has the effect of releasing the second escape wheel 12 from its engagement with the entry pallet 36, which makes it possible for the second wheel set 2 to drive, via the first escape wheel 8, the second escape wheel 12 in the anti-clockwise direction (see FIG. 2G).

Figure 2H:
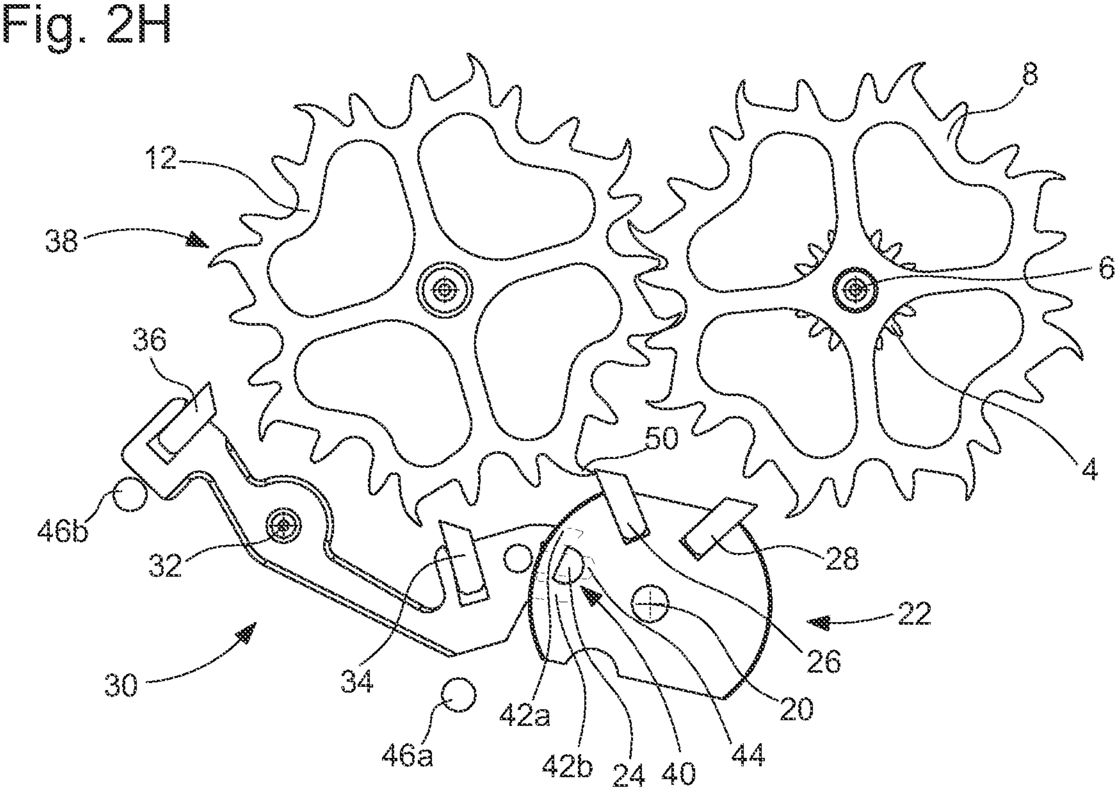
FIG. 2H is a view of the natural escapement at the moment when the second escape wheel set gives a so-called direct and tangential driving impulse to the balance plate via one of its teeth that drives the second impulse pallet-stone.
Figure 2I:
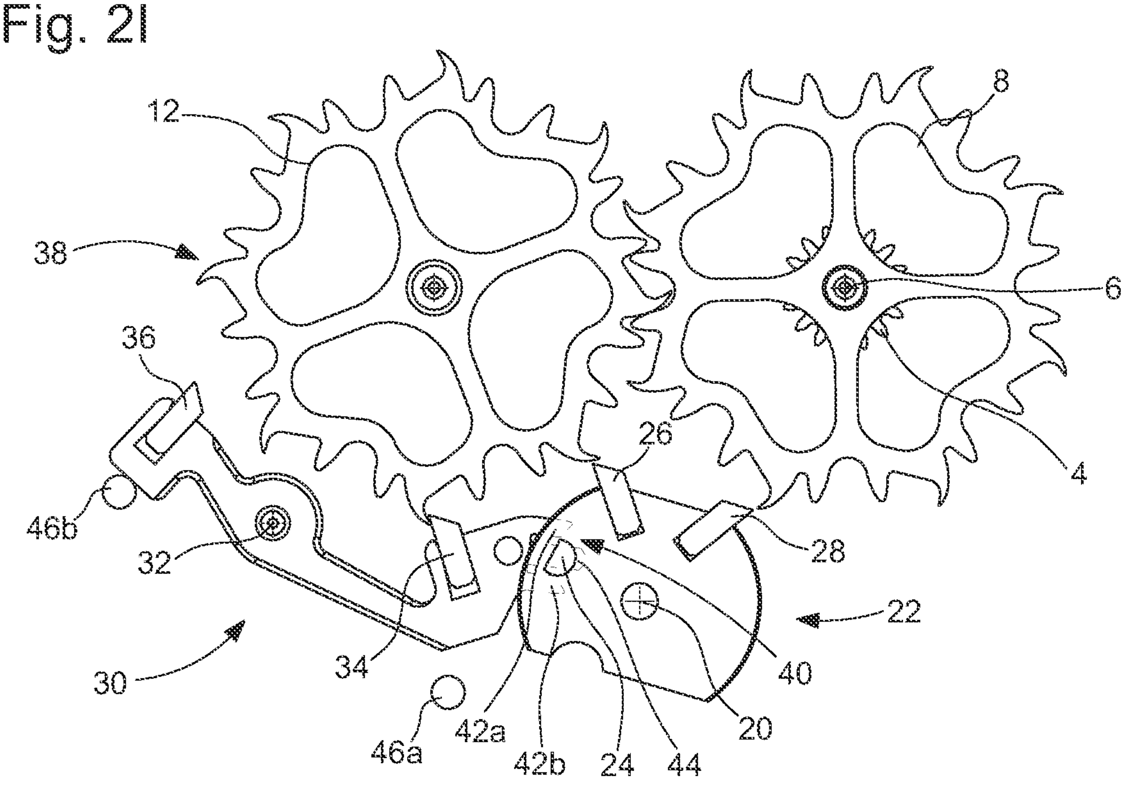
FIG. 2I is a view of the natural escapement at the moment when the pivoting of the second escape wheel set is again interrupted when, under the effect of the pivoting of the anchor, this second escape wheel set is pressed on the exit pallet.

The pivoting of the second escape wheel 12 is again interrupted when, under the effect of the pivoting of the anchor 30, this second escape wheel 12 is pressed on the exit pallet 34, this position being maintained thanks to pressing the anchor 30 against the second banking-pin 46*b* (see FIG. 2I).

Figure 2J:
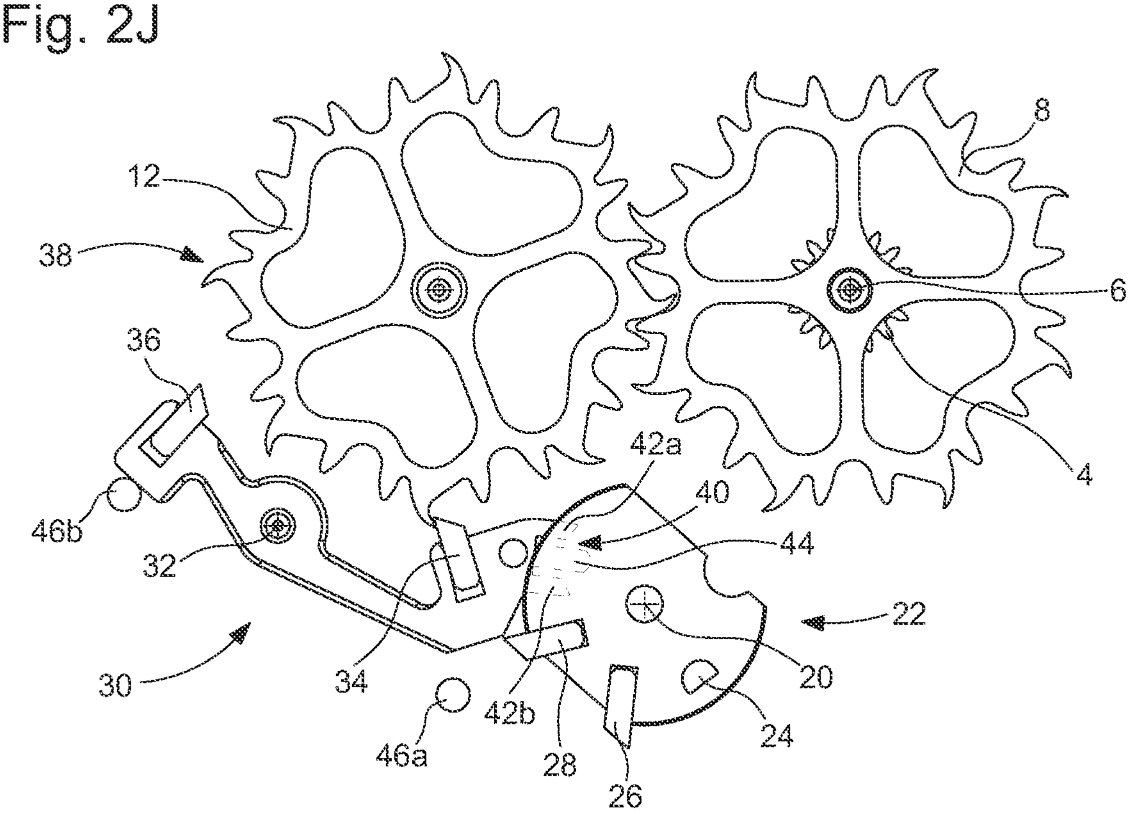
FIG. 2J is a view of the natural escapement returned in its first extreme position, which marks the end of the operating cycle of the natural escapement according to the invention.

It will be noted that at the same time as the first escape wheel 8 drives the second escape wheel 12 by pivoting in the anti-clockwise direction, the second escape wheel 12 also gives a so-called direct and tangential driving impulse to the balance plate 22 via one of its teeth 50 referred to as impulse tooth that drives the first impulse pallet-stone 26 (see FIG. 2H). The impulse is thus named because it is given directly by the second escape wheel 12 to the balance plate 22 and the path of the impulse tooth 50 tangentially catches that of the second impulse pallet-stone 28 of the balance plate 22, which makes an almost punctual contact possible and without friction. The balance plate 22 thus returns to its first extreme position, which marks the end of the operating cycle of the natural escapement 1 (see FIG. 2J).

Figure 3:
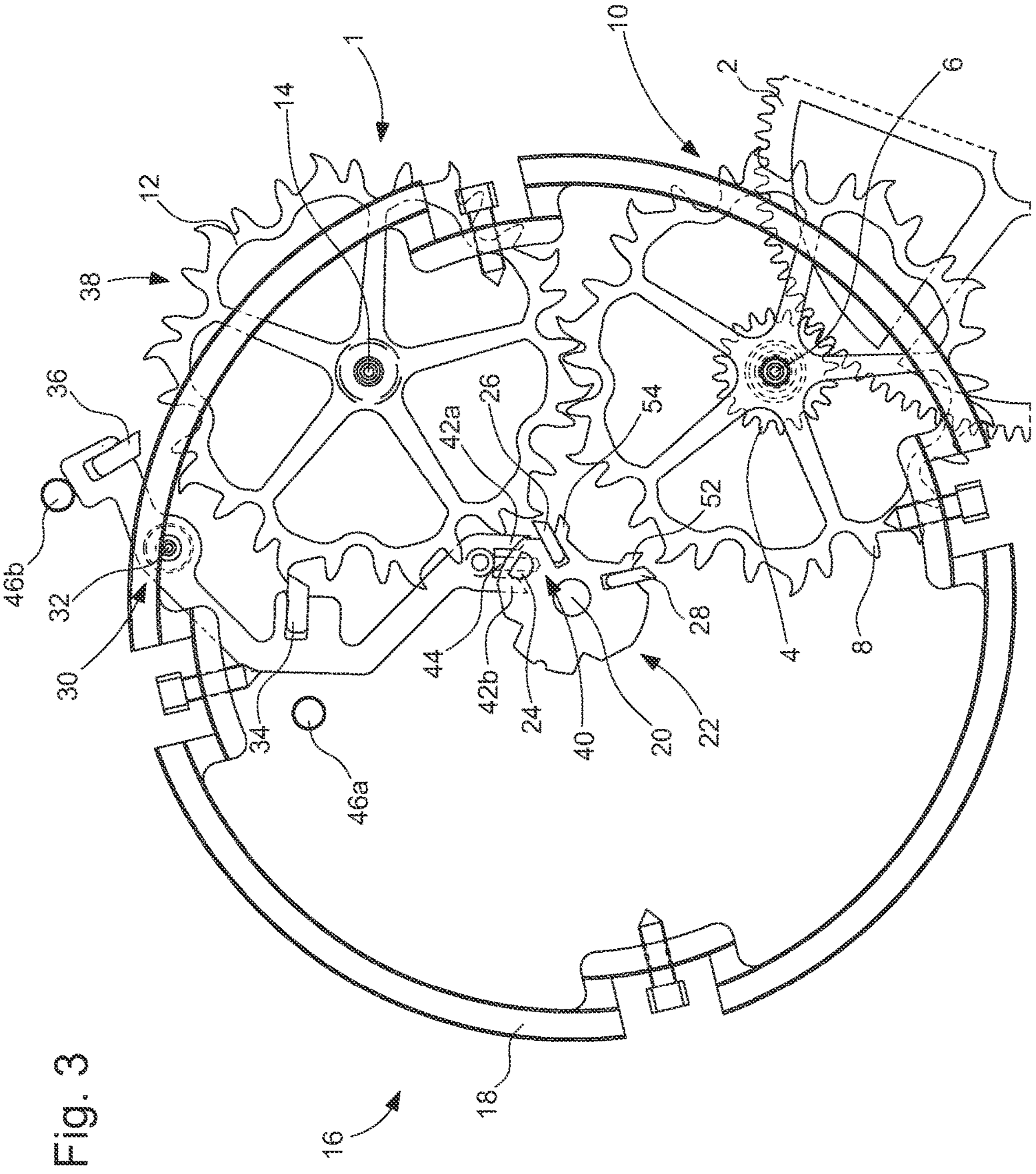
FIG. 3 is a view of the natural escapement of FIG. 1 with the balance plate provided with a first and a second safety tooth in accordance with the invention.
Figure 4:
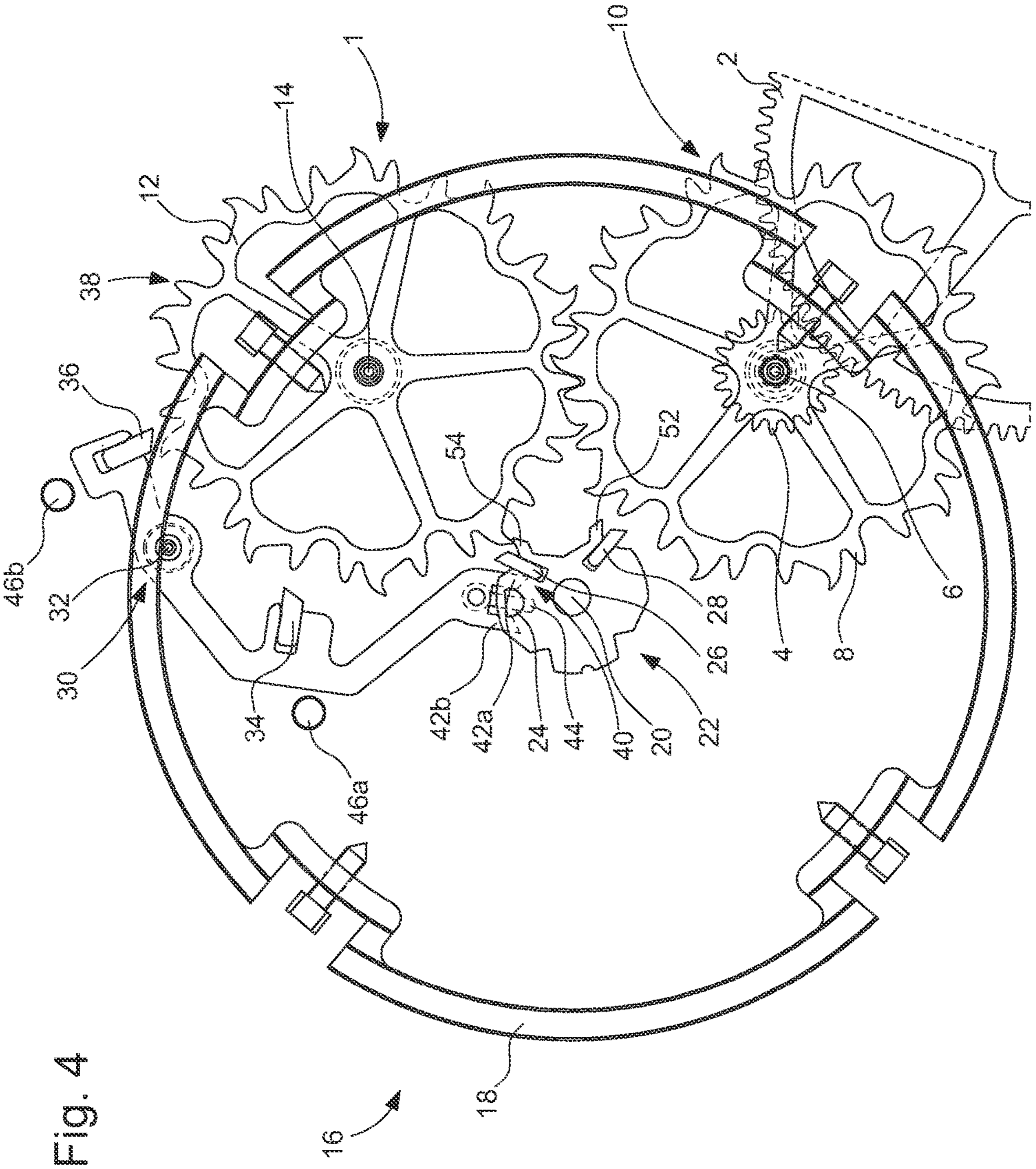
FIG. 4 is a view similar to that of FIG. 3 wherein one of the safety teeth of the balance plate prevents the rotation of the second escape wheel set while the balance does not have sufficient speed to bring the second impulse pallet-stone in the perimeter of rotation of the second impulse tooth of the second escape wheel set.

FIG. 3 is a view of the natural escapement of FIG. 1 with the balance plate 22 provided with a first and a second safety tooth 52, 54 in accordance with the invention. As already described above, the natural escapement 1 carries out a succession of operating cycles each consisting of a first and of a second alternation of the balance 16 that comprises a balance wheel 18 on the arbor 20 of which is adjusted the balance plate 22. This natural escapement 1 comprises a first escape wheel 8 having a first toothing 10 and that is arranged to be driven by the second wheel set 2. In turn, this first escape wheel 8 drives a second escape wheel 12 having a second toothing 38, these first and second escape wheels 8, 12 forming a kinematic chain after which is disposed the anchor 30 capable of pivoting about its anchor-staff 32. The balance plate 22 carries a second impulse pallet-stone 28 whereby this balance plate 22 receives a direct and tangential driving impulse from the first escape wheel 8 during the first alternation, and a first impulse pallet-stone 26 whereby this balance plate 22 receives a direct and tangential driving impulse from the second escape wheel 12 during the second alternation. In accordance with the invention, and as illustrated in FIG. 4, the balance plate 22 also carries at least one first safety tooth 52 arranged to cooperate with the toothing 10 of the first escape wheel 8, so as to lock this first escape wheel 8 when it rotates before the second impulse pallet-stone 28 is in its perimeter of rotation. Thus, by teaching to provide the balance plate 22 with at least one safety tooth 52 arranged such that this safety tooth 52 is engaged in the perimeter of rotation of the toothing 10 of the corresponding escape wheel 8 before this impulse pallet-stone 28 is engaged in this same perimeter of rotation of the escape wheel 8, the present invention makes it possible to retain the escape wheel 8 when it is not retained by the escapement function and to prevent the escape wheels 8, 12 from rotating uncontrollably. According to a special embodiment of the invention, the balance plate 22 illustrated in FIG. 4 carries, apart from the first safety tooth 52 that is arranged to cooperate with the toothing 10 of the first escape wheel 8, a second safety tooth 54 arranged to engage in the toothing 38 of the second escape wheel 12 before the first impulse pallet-stone 26 is engaged in the perimeter of rotation of the first escape wheel set 128. Such is the case in FIG. 4 where it can be seen that only the safety tooth 54 is engaged in the toothing 38 of the second escape wheel 12 and thus ensures the retention of the escape wheels 8, 12.

It goes without saying that the present invention is not limited to the embodiment that has just been described, and that miscellaneous modifications and simple variants may be envisaged by the person skilled in the art without departing from the scope of the invention as defined by the claims appended to the present patent application. It will be noted in particular that the first and/or second safety teeth 52, 54 may be made in one piece with the balance plate 22, or be attached on this balance plate 22. The present invention also relates to a horological movement provided with a natural escapement of the type described above. It also goes without saying that the present invention is not limited to the particular type of natural escapement that has just been described and that it may apply to other versions of natural escapement.

LIST OF REFERENCE SIGNS

1. Natural escapement
2. Second wheel set
4. Pinion
6. Arbor
8. First escape wheel
10. Toothing
12. Second escape wheel
14. Arbor
16. Balance
18. Balance wheel
20. Arbor
22. Balance plate
24. Balance pin
26. First impulse pallet-stone
28. Second impulse pallet-stone
30. Anchor
32. Anchor-staff
34. Exit pallet
36. Entry pallet
38. Toothing
40. Fork
42*a*, 42*b*. Horns
44. Dart
46*a*. First banking-pin
46*b*. Second banking-pin
48. Impulse tooth
50. Impulse tooth
52. First safety tooth
54. Second safety tooth

The invention claimed is:

1. A natural escapement for horological movement carrying out a succession of operating cycles each including a first and of a second alternation of a balance that comprises a balance wheel on an arbor of which is adjusted a balance plate, the natural escapement comprising:

a first escape wheel set having a first toothing, the first escape wheel set, arranged to be driven by a wheel set of a train of the horological movement, driving in turn a second escape wheel set having a second toothing, the first and second escape wheel sets forming a kinematic chain arranged to cooperate with an anchor capable of pivoting about an anchor-staff, the balance plate carrying a second impulse pallet-stone through which the balance plate receives a direct and tangential driving impulse from the first escape wheel set during the first alternation, and a first impulse pallet-stone through which the balance plate receives a direct and tangential driving impulse from the second escape wheel set during the second alternation, the balance plate also carrying a first safety tooth arranged to cooperate with the first toothing or the second toothing so as to lock the first or the escape wheel set when the first or second escape wheel set escapes to the second impulse pallet-stone or to the first impulse pallet-stone, respectively.

2. The natural escapement according to claim 1, wherein the first safety tooth is arranged to cooperate with the toothing the first toothing, and the balance plated carries a second safety tooth arranged to cooperate with the second toothing.

3. The natural escapement according to claim 2, wherein the first and second safety teeth are made in one piece with the balance plate.

4. The natural escapement according to claim 2, wherein the first and second safety teeth are attached on the balance plate.

5. The natural escapement according to claim 1, wherein the first safety tooth is made in one piece with the balance plate.

6. The natural escapement according to claim 1, wherein the first safety tooth is attached on the balance plate.

7. A horological movement comprising a natural escapement according to claim 1.

* * * * *